(No Model.)
P. ARNOLD.
PROCESS OF PREPARING CLAY.
No. 475,915. Patented May 31, 1892.
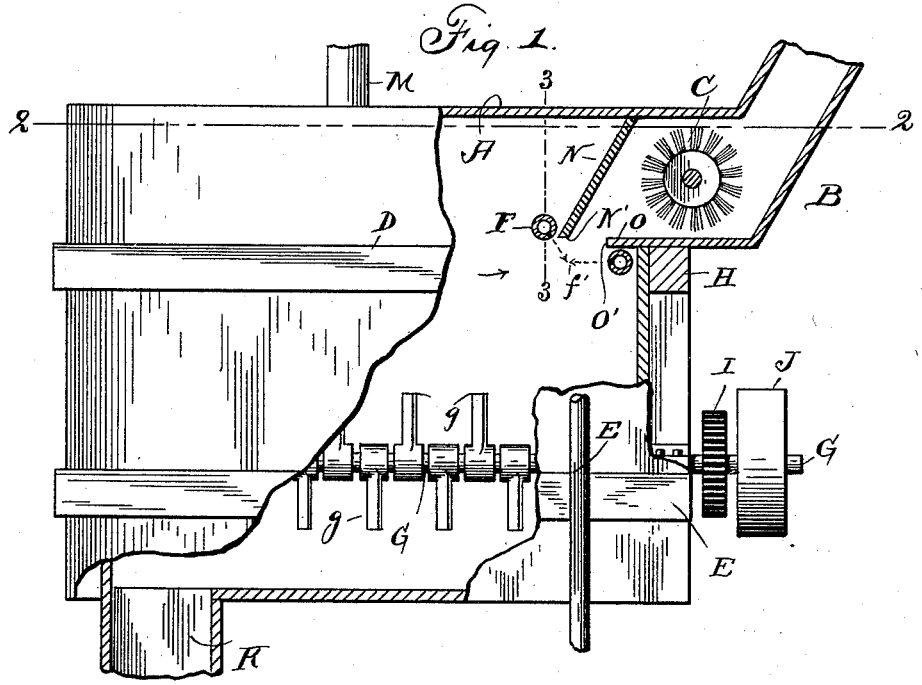
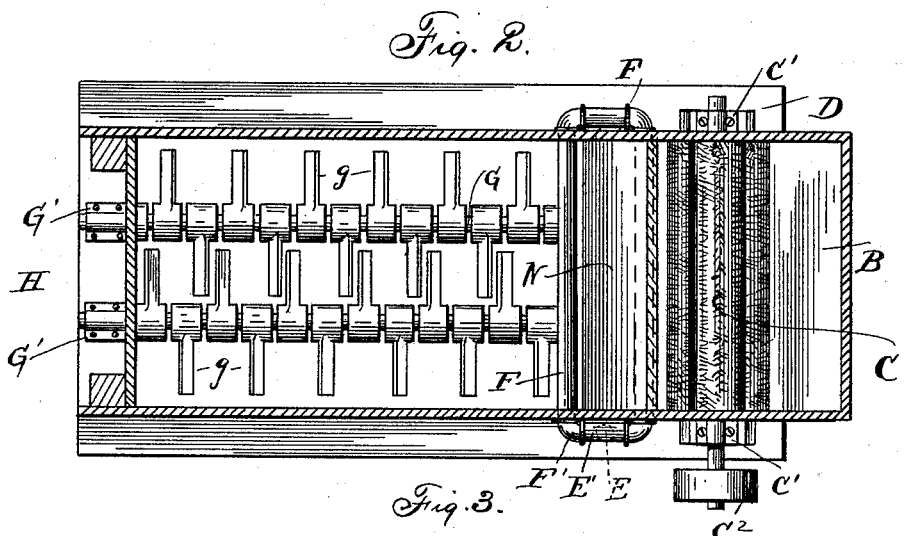
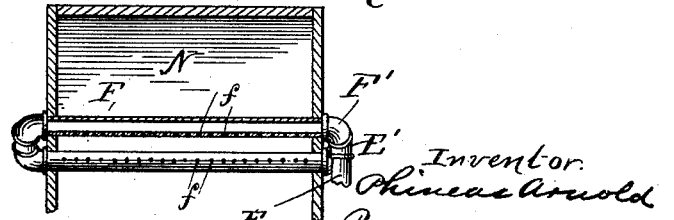
Witnesses
E. Byron Gilchrist
C. N. Dorer
Inventor
Phineas Arnold
By Leggett and Leggett
his Attorneys

UNITED STATES PATENT OFFICE.

PHINEAS ARNOLD, OF CANAL DOVER, OHIO.

PROCESS OF PREPARING CLAY.

SPECIFICATION forming part of Letters Patent No. 475,915, dated May 31, 1892.

Application filed February 27, 1892. Serial No. 423,032. (No model.)

*To all whom it may concern:*

Be it known that I, PHINEAS ARNOLD, of Canal Dover, in the county of Tuscarawas and State of Ohio, have invented certain new and useful Improvements in Processes of Preparing Clay; and I do hereby declare the following to be a full, clear, and exact description of the invention, such as will enable others skilled in the art to which it pertains to make and use the same.

My invention relates to an improved process of preparing clay for use in the manufacture of brick by the dry or semi-dry process.

The process heretofore employed of making brick by the dry or semi-dry process was unsuccessful and unsatisfactory, owing to the crazing or cracking of the surface of the brick, a feature that was exceedingly objectionable and that rendered the brick far from being perfect.

The crazing or cracking of the surface of the brick just alluded to is due in a great measure to the faulty preparation of the clay, the latter not being perfectly tempered and the quality of plasticity not having been sufficiently developed.

In the accompanying drawings, Figure 1 is a side elevation, partly in section, of an apparatus suitable for use in carrying out my improved process. Fig. 2 is a plan in section on line 2 2, Fig. 1. Fig. 3 is a section on line 3 3, Fig. 1, looking in the direction of the arrow.

Referring to the accompanying drawings, A represents a box or casing, preferably rectangular in plan. Box or casing A at the top and one end thereof has connected and in open communication therewith an inclined trough or chute or feed-box B, the latter extending, preferably, the entire width of box or casing A. At the lower end of trough, chute, or feed-box B is located a sprayer or scatterer C, the latter comprising, preferably, a rotating brush provided with rows of wire bristles. The trunnions of sprayer or scatterer C extend through the sides of box or casing A and have bearing in boxes C', supported by longitudinal beams D at the sides of box or casing A. Sprayer or scatterer C extends, preferably, the entire width of box or casing A, and the one trunnion thereof is provided with a driving-pulley, as at $C^2$.

E represents a steam-supply pipe that extends up along the one side of box or casing A and at the upper end is provided with a T E', that is connected by means of elbows F' with a coil of pipe F, that extends into and crosswise of box or casing A and preferably just outside the opposite side of said box or casing, the arrangement and configuration of elbows F' being preferably such that coil F will be located in an oblique plane, as shown in Fig. 1. The sections of the coil of pipe F have numerous perforations, as at $f$, (see Fig. 3,) said perforations being adapted to discharge the steam in jets, and as indicated by the arrows $f'$ in Fig. 1.

G represents rotating shafts that extend lengthwise through the lower part of box or casing A and are journaled in suitable boxes G', supported by cross-beams H at the ends of box or casing A. Shafts G are provided, respectively, with knives or blades $g$, alternate blades or knives of a shaft projecting in opposite directions, as shown in Figs. 1 and 2. Shafts G outside box or casing A are intergeared, as at I, and the one shaft is provided with a driving-pulley, as at J.

The bottom of box or casing A at the end of the same opposite to the location of the sprayer or scatterer C is provided with an opening K, that discharges into a box L, that is adapted to conduct the clay to the brick-machine. (Not shown.)

The clay is conveyed to the apparatus through chute, trough, or feed-box B in a dust-like or finely-disintegrated condition, and as it reaches the lower end of feed-box B is sprayed or scattered by means of the scattering device C through the steam issuing from the coil of pipe E. The clay thus becomes steamed and falls in a moist or saturated condition upon and among blades or knives $g$ of shafts G below, whereupon the clay is thoroughly worked by the action of said knives or blades and its plasticity developed while the blades or knives are working the clay forward to discharge-opening K.

M represents a pipe adapted to carry off any surplus steam, and N represents an apron extending crosswise of box or casing A and located a short distance forward of sprayer or scatterer C and being preferably arranged obliquely to the top of box or casing A, as shown. Directly above the outer section of coil F box or casing A has an inwardly-projecting ledge O, that also extends the entire width of said box or casing. By reference to Fig. 1 of the drawings it will be observed that the inner ends N' and O' of apron N and ledge O, respectively, extend over the respective sections of coil F, whereby the clay sprayed or scattered by means of sprayer C aforesaid is compelled to take a course through the steam issuing from coil F.

By my improved process of preparing the clay previous to its introduction into the brick-machine the plasticity of the clay is more highly developed, and by the use of clay prepared by my improved process the manufacture of brick is not only greatly facilitated, but the surface of the brick made of this clay is not liable to craze or crack.

What I claim is—

The process of preparing clay herein described, the same consisting, first, in taking the clay in a dust-like or finely-disintegrated condition and spraying or scattering the same through steam, and, secondly, in working the clay to develop its plasticity, substantially as set forth.

In testimony whereof I sign this specification, in the presence of two witnesses, this 27th day of January, 1892.

PHINEAS ARNOLD.

Witnesses:
JOHN A. HOSTETTER,
PHIL. H. KOEHLER.